United States Patent
Newby

(10) Patent No.: US 8,376,411 B2
(45) Date of Patent: Feb. 19, 2013

(54) SPLIT BODY CONDUIT FITTING

(76) Inventor: Michael Newby, Murfreesboro, TN (US)

(*) Notice: Subject to any disclaimer, the term of this patent is extended or adjusted under 35 U.S.C. 154(b) by 54 days.

(21) Appl. No.: 12/877,104

(22) Filed: Sep. 7, 2010

(65) Prior Publication Data

US 2011/0057440 A1 Mar. 10, 2011

Related U.S. Application Data

(60) Provisional application No. 61/240,074, filed on Sep. 4, 2009.

(51) Int. Cl.
*F16L 11/118* (2006.01)
(52) U.S. Cl. .......... 285/154.1; 285/419; 174/50; 29/463
(58) Field of Classification Search ............... 285/149.1, 285/152.1, 154.1, 419; 174/50, 481, 561, 174/559
See application file for complete search history.

(56) References Cited

U.S. PATENT DOCUMENTS

| | | | | | |
|---|---|---|---|---|---|
| 266,483 | A | * | 10/1882 | Kruesi | 285/414 |
| 733,568 | A | * | 7/1903 | Sundh | 174/50 |
| 835,504 | A | * | 11/1906 | Edwards et al. | 285/149.1 |
| 854,020 | A | * | 5/1907 | Bossert | 285/419 |
| 988,461 | A | * | 4/1911 | Graybill | 285/154.1 |
| 1,020,123 | A | * | 3/1912 | Brampton et al. | 285/149.1 |
| 1,650,233 | A | * | 11/1927 | Plunkett | 285/419 |
| 3,168,613 | A | * | 2/1965 | Palmer | 174/50 |
| 3,224,796 | A | * | 12/1965 | Burkitt | 285/149.1 |
| 3,342,511 | A | * | 9/1967 | Galloway | 285/149.1 |
| 5,016,924 | A | * | 5/1991 | Lin | 285/179 |
| 5,302,780 | A | * | 4/1994 | Alfing | 174/28 |
| 5,443,096 | A |   | 8/1995 | King | |
| 5,621,189 | A | * | 4/1997 | Dodds | 174/50 |
| 6,300,560 | B1 |   | 10/2001 | Mankins | |
| 6,450,551 | B1 | * | 9/2002 | Lee | 285/419 |
| 6,527,302 | B1 | * | 3/2003 | Gault et al. | 285/149.1 |
| 6,580,029 | B1 | * | 6/2003 | Bing | 174/60 |
| 6,758,499 | B1 |   | 7/2004 | Belew et al. | |
| 6,851,722 | B2 | * | 2/2005 | Chiu et al. | 285/419 |
| 7,109,416 | B1 | * | 9/2006 | Reed | 174/50 |
| 7,416,227 | B1 | * | 8/2008 | Earnest | 285/419 |
| 7,893,363 | B2 | * | 2/2011 | Pyron | 174/481 |
| 7,954,858 | B2 | * | 6/2011 | Pyron | 285/149.1 |
| 2006/0108789 | A1 |   | 5/2006 | Hughes | |
| 2007/0176411 | A1 |   | 8/2007 | Hughes | |

* cited by examiner

*Primary Examiner* — David E Bochna
(74) *Attorney, Agent, or Firm* — Stites & Harbison PLLC; Nicolo Davidson; Richard S. Myers, Jr.

(57) ABSTRACT

A conduit fitting that comprises a first shell, a second shell, and a cover, wherein the first shell comprises top and bottom edges and the second shell comprises top and bottom edges, with the edges mating along a common plane to form a conduit fitting body, the body defining a cavity; the first and second shells further comprising attachment members to facilitate mating along a common plane; the first and second shells together defining at least one proximate opening and at least one distal opening to the cavity; the conduit fitting defining a cover opening for access to the cavity; and a cover that removably seals the cover opening.

15 Claims, 5 Drawing Sheets

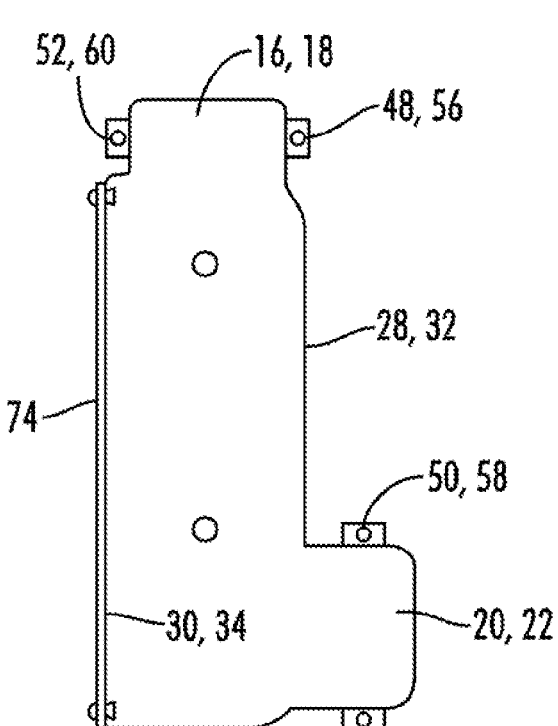
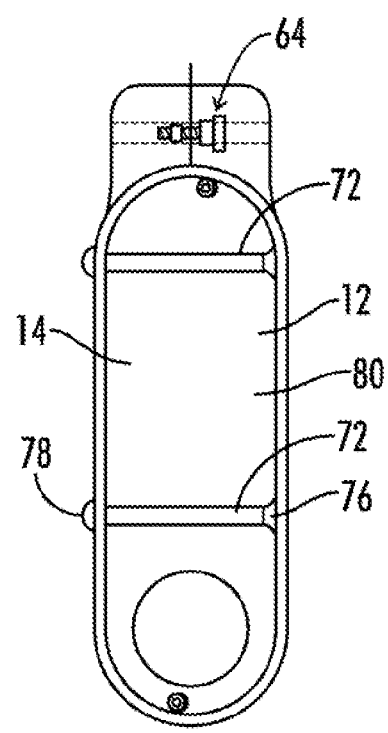
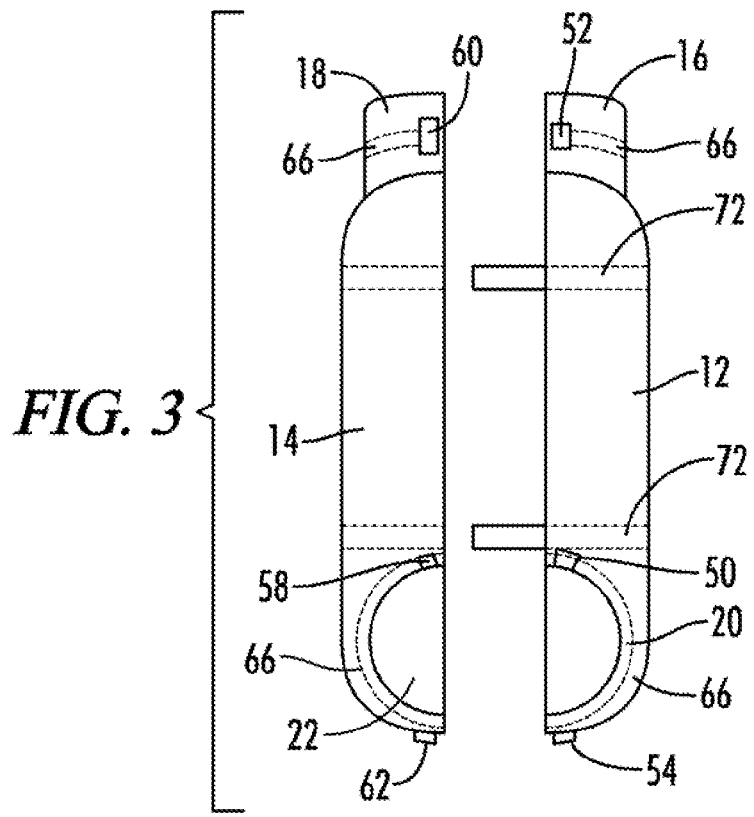
FIG. 1
FIG. 2
FIG. 3

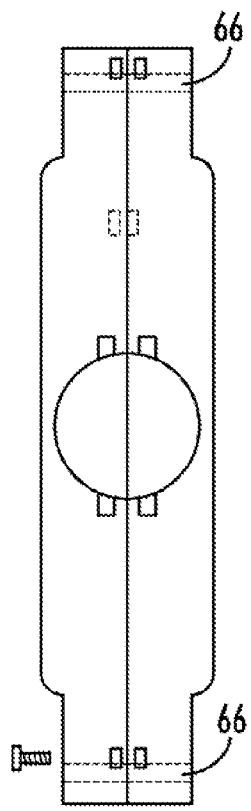
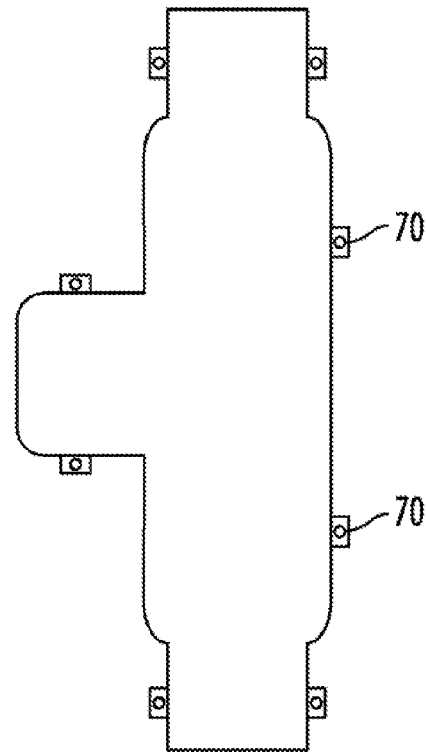
FIG. 4    FIG. 5
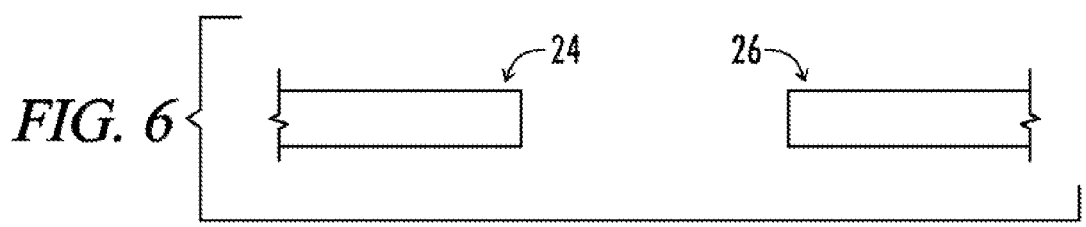
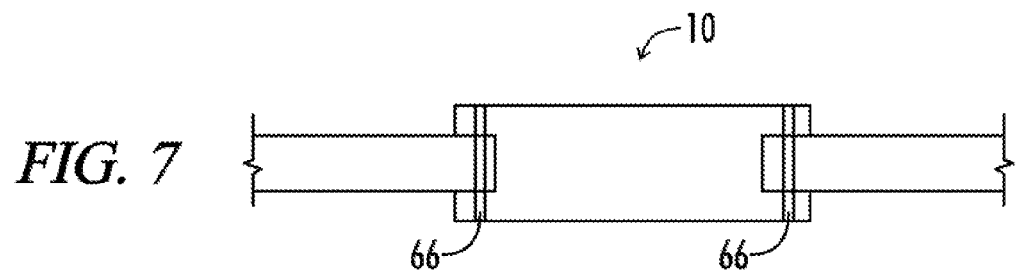
FIG. 6
FIG. 7

SPLIT BODY CONDUIT FITTING

PRIOR APPLICATIONS

This application claims benefit to U.S. application Ser. No. 61/240,074, filed on Sep. 4, 2009, the contents of which are incorporated herein by reference.

BACKGROUND OF THE INVENTION

The present invention relates generally to repairing conduits and, more specifically, to replacing conduit junction boxes or damaged conduit sections. Even more particularly, the present invention relates to conduit repair kits and methods of replacing junction boxes that do not require removal of the material being housed in the conduit/junction box to affect the repair and/or replacement of the damaged junction box or conduit.

Conduits and conduit junction boxes are employed in myriad applications, such as routing electrical lines through a building to protecting sensitive fiber optic cables from damage. Regardless of the particular application, conduits/junction boxes are pervasively used in the construction of new facilities/buildings and the repair or renovation of old facilities/buildings. As such it is not uncommon for conduits/junctions boxes to be damaged and in need of repair; this is true irrespective of the specific conduit construction (e.g. composite-based conduits such as PVC, metallic-based conducts, etc.).

Unfortunately, repairing the conduit/junction box or replacing damaged conduit sections is often an arduous and toilsome process. Consider a conduit/junction box carrying communication cables (such as CAT5 cables) from a network server to all of the computers throughout the facility. Some of the cables may be several hundred feet in length. In a traditional repair, the damaged conduit section would be removed, often by cutting it out, and a replacement section would be prepared—with the risk that the cables might be harmed during the removal process. However, before the replacement conduit can be bridged between undamaged conduit sections, the cables must first be pulled out of the conduit—the replacement conduit sleeve or junction cannot be fitted into place unless the cables are first removed else the presence of the cables prevents the replacement sleeve or junction from properly mating to the undamaged conduit sections.

Pulling the cables out of the conduit can be a time consuming endeavor, in part, due to the length and number of the cables that must be removed. In many situations cable removal can take hours, not to mention the time expended re-running the cables through the replacement section after the repair/replacement has been completed. Conduit repair has not been a problem ignored by the prior art. For instance, U.S. Pat. No. 6,758,499 issued to Belew et al. discloses a conduit repair system featuring two hinged couplers and a bridging duct with a narrow slit along its length. After the damaged section of conduit has been removed, Belew et al. describes opening the couplers, via the hinges, so that each coupler can be positioned over opposing undamaged sections of conduits. The couplers are then clamped and secured to the undamaged conduit. Next, the bridging duct is moved into position over the couplers. The bridging duct is secured to the couplers by closing the narrow slit running along its length and placing a fastener on the slit to prevent the slit moving opening and allowing the bridging duct to disengage from the couplers. Unfortunately, the narrow slit does not afford the bridging duct with the ability to be positioned if numerous wires (or large diameter wires) are housed in the conduit.

U.S. Pat. No. 5,443,096 issued to King discloses a pipe repair coupling having two hemicyclic coupling segments having identical cross sections, lengths, and widths. Each segment has an elongated edge with snap fit couplings to allow the segments to be placed around a pipe and be snapped together over the pipe to form a seal around the pipe. Prior to squeezing and snapping the segments together, King advocates applying an adhesive between the pipe and the segments. Undesirably, the small variances in the diameter of the pipe or segments can result in a loose fit and a poor seal.

U.S. Patent Application Publication Nos. 2006/0108789 and 2007/0176411 filed by Hughes, discloses a unitary conduit repair joint having a female end with an opening diameter larger than that of the damaged conduit so that after the damaged section has been removed, the female end may slip over a first end of undamaged conduit. The unitary repair joint also has a male end, opposite the female end, with an opening diameter less than that of the conduit so that the male end may be inserted into the second end of the undamaged conduit. In operation, the female end is slid over the first end of the conduit far enough to allow the male end to align with the second end of the conduit. Then the male end is encouraged forward into the second end while the female end remains engaged to the first end. To create an adequate seal, an adhesive is used to bond the male and female ends to the undamaged conduit.

U.S. Pat. No. 6,300,560 describes a replaceable conduit connector for wiring systems that comprises front and back members with notches and ears outside a common plane, limiting it durability and versatility.

Although the prior art proffers many solutions to repair/replace damaged conduits and pipes, the prior art is devoid of a conduit repair kit that can adequately replace/repair a conduit or conduit junction box without need to remove the items housed in the conduit, regardless of the size or number of items employing the conduit/junction box for protection and routing.

Thus, what is needed then, is a system and method for repairing conduits, specifically conduit junction or routing boxes, that can be easily completed without the use of extensive tooling, permitting the material/items housed by the conduit/junction box to remain while the repair/replacement is affected, and is cost and time sensitive.

BRIEF SUMMARY OF THE INVENTION

One aspect of the present invention is providing a conduit fitting for coupling two or more conduits together.

Another aspect of the present invention is provide such a fitting that is easily installed or replaced without the necessity of removing items housed in the conduit.

Other aspect of the present invention are obvious in view of the present disclosure.

The present invention relates generally to a system and method of repairing conduits, pipes, junction boxes and other mediums that are used to protect, carry, transport, and/or route materials such as cables and wires. More specifically, the present invention pertains to conduit repair kits and methods of repairing/replacing conduits and conduit junction boxes that do not require removal of the materials or items in the conduit/junction box to affect the repair/replacement of the damaged section.

To accomplish this task, and in the context of a junction box with a single entry and single exit, the present invention provides first and second tubular hemicyclic shells. These hemicyclic or semicircular shells can roughly be described as two halves of a cylinder. Each shell has a top edge and a bottom edge extending along the length of the shells. The shells also have an entry opening and an exit opening. In accordance with the hemicyclic shape of the shells, the openings have "half-moon" shapes. The openings are defined, in part, by an opening circumference, i.e. the arc length traced by the perimeter of the openings which extends between the top and bottom edges. The length of the circumferences for both the entry opening pair (the entry opening for each shell) and exit opening pair (the exit opening for each shell) is selected so that each opening pair is greater than the circumference of the conduit(s) over which the openings will be coupled.

Often the face of the openings are perpendicular to each other so that the junction box can force the wires/cables running therethrough to change direction—whether to round a corner, avoid an obstacle, etc. However, the present invention also envisages junction boxes that have three or more openings (e.g. a "T" junction) to allow some cables or wires to continue along a straight path while altering the routing of others to a disparate location. Moreover, the openings need not be at the ends of the shells but rather may be positioned along the body of the shell(s) to accommodate existing or unique conduit topologies.

However, regardless of the particular embodiment, the present invention also provides a plurality of attachment members located along the top and bottom edges of the shells. Importantly, one or more of these attachment members are located proximate the entry and exit openings. The attachment members on one shell are located to communicate with the attachment members on the other shell once the shells have been aligned and joined. This permits the two shells to be secured together via the attachment members.

In one embodiment, the attachment members are tabs projecting away from the shells. The tabs include threaded bores that accept screws which can be used to encourage the shells to join, i.e., tighten the shells together to form a seal. Even more preferably, there are sets of attachment members proximate both the top and bottom edges to securely fasten the present invention, via the hemicyclic shells, to the existing/remaining conduit(s). Importantly, the attachments members engender the present invention with the ability to readily separate after they have been joined to facilitate the replacement process if the junction box of the present invention is damaged.

In some embodiments, the present invention provides a notch or recess in the entry and exit openings suitable to locate and restrain a resilient grommet. Thus, grommets may be placed on the undamaged sections of conduit, over which the present invention will couple (specifically over which the entry and exit opening will couple) and when the entry and exit openings are positioned and coupled to the undamaged conduit sections, the notches will align with the grommet(s). As the attachment members are secured together, the grommets will be compressed and provide a secure seal between the present invention and the undamaged sections of the existing conduit.

The top edge may also have a groove and the bottom edge may have a projection (or vice versa), matched to the geometry of the groove so that when the two shells are joined, the projection and the groove mate to both guide the shells during the joining process and to create a seal after the shells have joined.

Thus, after the damaged junction box has been removed from the conduit at first and second conduit locations, thereby exposing the cables therein, the present invention is operable to envelop the exposed cables (via the two hemicyclic shells) and couple to the conduit at the first and second conduit locations (via the entry opening, the exit openings, and the attachments members) to replace the junction box without necessitating the removal of the cables.

As such, the present invention provides a method and system for repairing/replacing conduits and conduit junction boxes, without the need to remove the cables housed therein, in a quick and cost effective manner.

BRIEF DESCRIPTION OF THE SEVERAL VIEWS OF THE DRAWINGS

FIG. 1 is a side view of one embodiment of the present invention.

FIG. 2 is a back view of one embodiment of the present invention with the cover removed.

FIG. 3 is an exploded back view of the present invention.

FIG. 4 is a top view of another embodiment of the present invention.

FIG. 5 is a side view of the embodiment of FIG. 5.

FIG. 6 is a side view of a conduit system with a damaged portion removed.

FIG. 7 is a side of the yet another embodiment of the present invention coupled to the conduit system of FIG. 6.

DETAILED DESCRIPTION OF THE INVENTION

Figure 8:
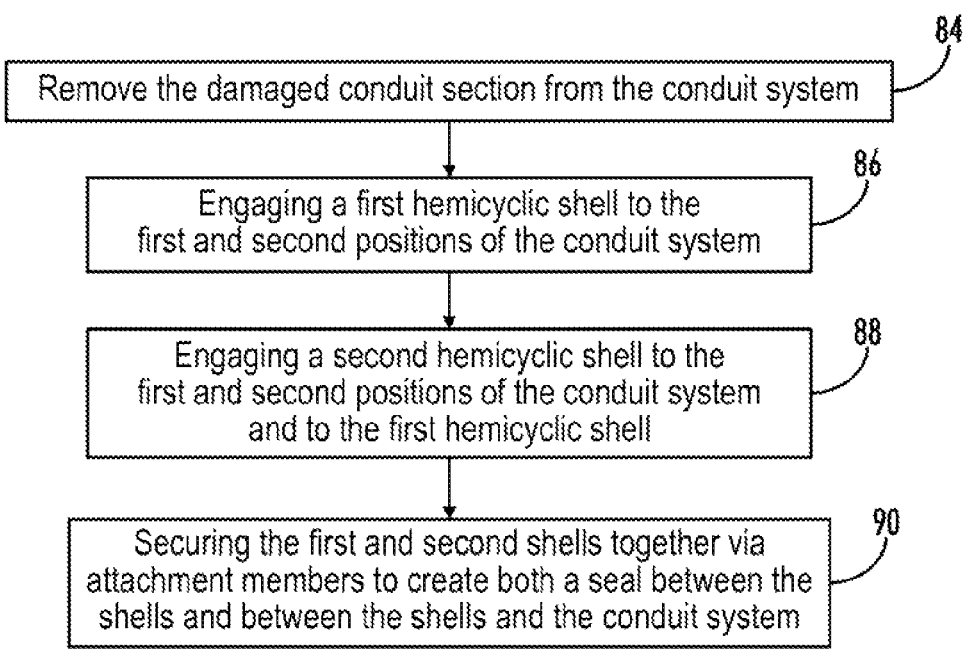
FIG. 8 is a flow chart representing a method of the present invention.

The present invention relates generally to a system and method of replacing and/or repairing conduits, conduit junction boxes and similar devices that are used to protect, carry, transport, and/or route materials such as cables and wires. More specifically, the present invention relates to conduit repair kits and a method thereof to repair and/or replace conduits and conduit junction boxes that do not require the removal of the cables or wires housed therein.

Repairing conduit systems (the collection of conduits, couplings, junction boxes, and support members) is a common problem. Unfortunately, when the conduit system houses cables and/or wires, the repair efforts can include the tedious and time-consuming process of pulling the cables/wires out of the conduit system prior to affecting the repair. Traditionally, the removal is necessitated because if the cables/wires are not removed, the component replacing the damaged section of the conduit system cannot be properly positioned. Consider that the replacement component is often a closed-sleeve or elbow-type component that cannot be opened to allow placement over the cables/wires. The present invention rectifies this problem, as described below.

FIG. 2 depicts one embodiment of the present invention 10. Specifically, the present invention 10 includes a first tubular hemicyclic shell 12 and a second tubular hemicyclic shell 14. The first and second shells 12 and 14 are designed to fit together to form one unitary structure, such as a conduit junction box or conduit elbow. The shape and dimensions of the first and second shells 12 and 14 are selected to correspond to the conduit system in which they will be employed. For example, the shells 12 and 14 may have a cylindrical shape or a rectangular shape. Further, the shells 12 and 14 may also take the form of an elbow (as shown in FIG. 2) to route/change the direction of the cables or a junction box (as shown in FIG. 5) to direct a subset of cables in a first direction and the remaining cables in another direction or multiple directions. The shells 12 and 14 may be fabricated from a composite material, such as a plastic, or from a metallic material.

When the shells 12 and 14 are joined, a cavity 13 is created between them suitable for housing and communicating cables from one or more entry points to one or more exit points. To this end, each shell 12 and 14 has an entry opening 16 and 18, respectively, and an exit opening 20 and 22, respectively (also referred to as first and second hemicyclic entry openings 16 and 18 and first and second hemicyclic exit openings 20 and 22).

Now referring to FIG. 8, steps 86 and 88. After the present invention 10 has been positioned, the first and second entry openings 16 and 18 are proximate the first conduit location 24, one location on the conduit system previously attached to the damaged component that was removed from the conduit system (step 84 in FIG. 8). Additionally, the first and second exit openings 20 and 22 are proximate the second conduit location 26, the other location on the conduit system previously attached to the damaged component. Thus, the present invention 10 bridges the gap, between undamaged sections of the conduit system 24 and 26, resultant from the removal of the damaged component. Advantageously, because of the unique two piece design, as will be expounded on below, the present invention 10 can be joined to the first and second conduit locations 24 and 26 without having to first remove the cables between those two locations.

Figure 9:
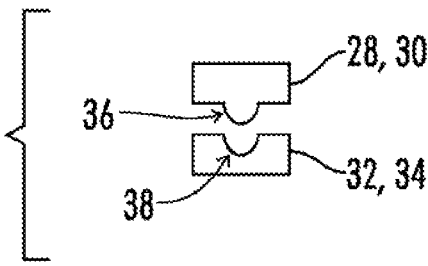
FIG. 9 is a detailed view of the projection and groove interaction.

The first shell 12 also includes first top and bottom edges 28 and 30 and the second shell 14 includes second top and bottom edges 32 and 34. These edges 28, 30, 32, and 34 may be described as the edges of the first and second shells 12 and 14 that mate or are in intimate contact after the shells 12 and 14 have been joined together. To ensure a quality seal between the shells 12 and 14 and assist with the alignment between the shells 12 and 14 during the joining/mating process, the first top and bottom edges 28 and 30 may contain a projection 36 and the second top and bottom edges 32 and 34 may contain a groove 38 (or vice versa), as shown in FIG. 9. The projection 36 and groove 38 are shaped to correspond to each other so that the projection 36 may be received into the groove 38. This arrangement provides additional structural integrity to the present invention 10 after the shells 12 and 14 have been joined. The projection 36 and groove 38 may extend along the entire length of the edges 28, 30, 32, and 34 or only a portion thereof However, it is will be obvious to those of ordinary skill in the art that other coupling mechanisms would serve similar purposes and are, accordingly, envisioned by the present invention 10, e.g., adhesives on the edges 28 and 30 or 32 and 34.

Figure 10:
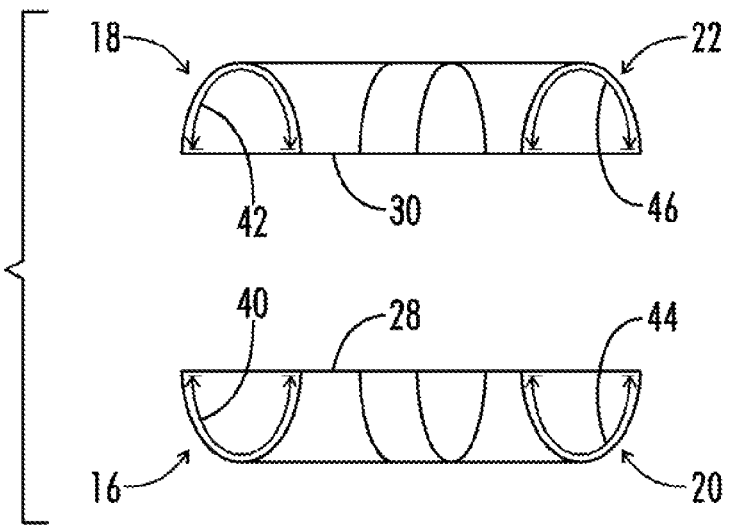
FIG. 10 is a side perspective view of one embodiment of the present invention with multiple exit openings.
Figure 11:
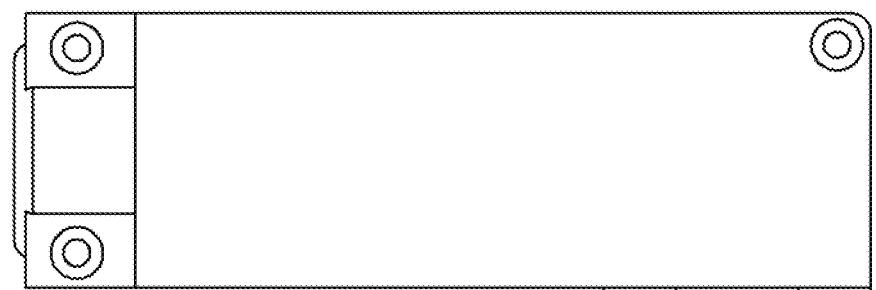
FIG. 11 shows a side view of an embodiment of the present invention.
Figure 12:
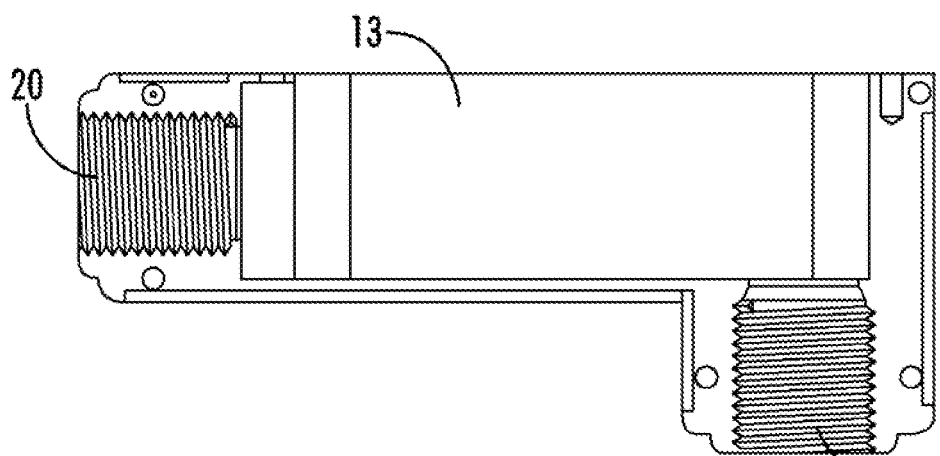
FIG. 12 shows a side view of one shell of the conduit fitting.
Figure 13:
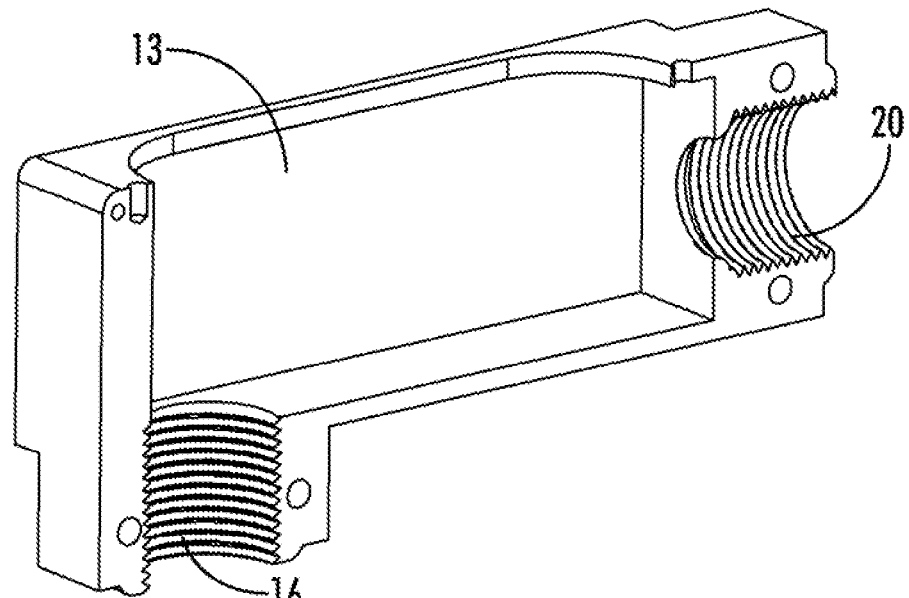
FIG. 13 shows a side perspective view of one shell of the conduit fitting.
Figure 14:
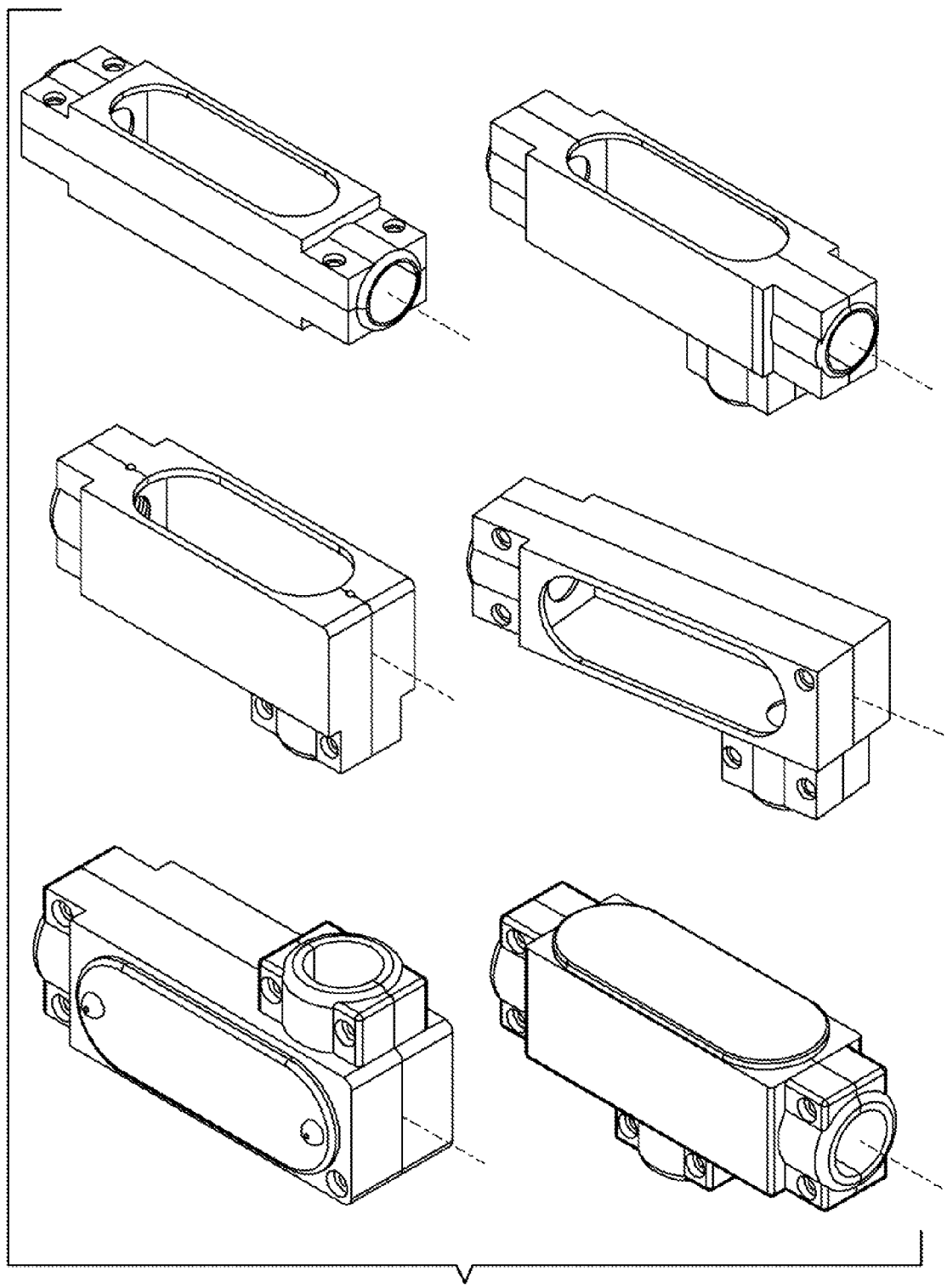
FIG. 14 shows different embodiments of conduit fittings of the present invention, and show examples of the common plane shared by the first shell and the second shell.

Each of the first and second entry and exit openings 16, 18, 20, and 22 has a circumference 40, 42, 44, and 46; respectively, as shown in FIG. 10. The circumference may describe the arc length of a half circle if the openings 16, 18, 20, and 22 are part of a cylindrical shell embodiment or, more generally, the length of the perimeters of the openings 16, 18, 20, and 22 (the length of the rim of an opening between shell edges). Moreover, the conduit system at the first and second conduit locations 24 and 26 has a circumference (in some instances a different circumference at each location 24 and 26). The combined circumference of the first and second entries 16 and 18 is selected to be greater than the circumference of the conduit system at the first conduit location 24. The permits the shells 12 and 14, via the first and second entry openings 16 and 18, to fit over or encompass the conduit system at the first location 24. Likewise, the combined circumference of the first and second exit openings 20 and 22 is selected to be greater than the circumference of the conduit system at the second conduit location 26 to enable the shells 12 and 14 to fit over the conduit system at the second conduit location 26.

To allow the openings 16, 18, 20, and 22 to fit over the conduit locations 24 and 26, the distance between the first entry and exit openings 16 and 20 and the second entry and exit openings 18 and 22 must be greater than the distance between the first and second conduit locations 24 and 26. This distance may be referred to as the replacement length. Depending on the orientation between the entry opening (defined by the first and second entry openings 16 and 18) and the exit opening (defined by the first and second exit openings 20 and 22), the replacement length may describe a straight line, may contain a ninety degree angle (as in the case of the right angle elbow junction box of FIG. 1), or any other curved line (or otherwise) between any two entry and exit openings.

Now referring to FIGS. 1 and 3. To effectively secure the shells 12 and 14 together once they have been coupled to the conduit system, the present invention 10 provides a plurality of attachment members. Specifically, each of the first entry and exit openings 16 and 20 includes a first top attachment member 48 and 50, respectively, adjacent the first top edge 28 and a first bottom attachment member 52 and 54, respectively, adjacent the first bottom edge 30. Each of the second entry and exit openings 18 and 22 includes a second top attachment member 56 and 58, respectively, adjacent the second top edge 32 and a second bottom attachment member 60 and 62, respectively, adjacent the second bottom edge 34.

Thus, when the shells 12 and 14 are joined around the conduit system, the first top attachment member for the entry 48 and the second top attachment member for the entry 56 are coupled together, the first bottom attachment member for the entry 52 and the second bottom attachment member for the entry 60 are coupled together, the first top attachment member for the exit 50 and the second top attachment member for the exit 58 are coupled together, the first bottom attachment member for the exit 54 and the second bottom attachment member for the exit 62 are coupled together.

This permits the shells 12 and 14 to both securely couple to each other and also the conduit system (via the relationships of the circumference openings to the conduit system circumference(s)), as shown in step 90 of FIG. 8. The attachment members may be tabs that allow a screw or bolt 64 to be inserted therethrough to secure any two corresponding tabs together. The attachment members may also be clasped, clamped, adhered, or otherwise detachably affixed together. The ability to separate the shells 12 and 14 is of paramount importance because this allows the present invention 10 to be easily removed if damaged (in addition to engendering the present invention 10 with the ability to be coupled to the conduit system without first removing the cables in the system). Further, the attachment members may also describe a clamp or band that is fitted over the entry or exit opening to compress the shells 12 and 14 together and to the conduit system. The attachment members need not be limited to areas around the entry and exit openings. Rather, the attachment members can and preferably are positioned at multiple locations along the edges 28, 30, 32, and 34 to ensure a reliable coupling between the shells 12 and 14, as shown in FIG. 5 by body attachment members 70.

It is not uncommon for the conduit system, especially the first and second conduit locations 24 and 26 to be deformed or slightly misshapen, whether a result of the damaged component removal process or manufacturing deficiencies. To combat these problems, one embodiment of the present invention 10 includes a grommet recess 66 or set of recesses 66 located proximate the entry and exit openings, as shown in FIGS. 3 and 4. Grommets or other compressible, resilient interfaces could be located in the grommet recesses 66 to provide a secure engagement between the present invention 10 and the conduit system at the first and second locations 24 and 26. Specifically, the grommets would accommodate any engagement irregularities between the present invention 10 and the conduit system as the grommets could compress or expand to follow the contours of the irregularity (whether the irregularity is associated with the present invention or the conduit system). Moreover, the grommet would lessen the necessity that the present invention 10 be sized to a single specific conduit system as the resilient grommet will account for slight dimensional differences (allowing a particular embodiment of the present invention 10 to be used across a range similarly sized conduit systems).

The grommet recesses 66, which house the grommets, may be oriented similarly to the opening circumferences 40, 42, 44, and 46. In the preferred embodiment, the grommet recesses 66 are coextensive with the opening circumferences 40, 42, 44, and 46. Accordingly, the grommet for each of the entry opening and exit opening may be comprised of two separate pieces (one for the first entry opening 16, second entry opening 18, first exit opening 20, and second exit opening 22) to allow the assembled grommet to fit over the cables running in the conduit system. In another embodiment, the two grommets are placed over the conduit system, one at the first conduit location 24 and one at the second location 26, after the damaged component has been removed (but before the present invention is installed) to allow the grommet recesses 66 to be positioned over and engage to the previously placed grommets.

The present invention may also provide stabilizing bars 72, as shown in FIGS. 2 and 3. Once the shells 12 and 14 have been engaged, the stabilizing bars 72 extend from the interior surface one of shell 12 or 14 across to the interior surface of the other shell 12 or 14. The bars 72 help to provide rigidity to the present invention 10. Preferably, the stabilizing bars 72 are hollow to allow a screw or bolt to be inserted therein. The diameter of the stabilizing bars 72 are sized to permit the body of the screw or bolt to pass but not the screw or bolt head. Thus, the bolt or screw provides a compressive force to hold the shells 12 and 14 together because the screw/bolt head acts as a first compression point 76 on one shell 12 or 14 and the other end of the screw/bolt, coupled to the other shell 12 or 14, acts as a second compression point 78.

The present invention 10 may also provide a cover 74 to permit easy access to the contents of the present invention 10 after the present invention 10 has been installed in the conduit system. Specifically, the cover 74 overlays a cover opening 80 that permits access to the cavity defined between the two shells 12 and 14. In effect the cover 74 acts as one side or end of the present invention 10. Preferably, the cover 74 would couple to both of the shells 12 and 14 after the shells 12 and 14 have been joined.

Thus, although there have been described particular embodiments of the present invention of a new and useful conduit fitting, it is not intended that such references be construed as limitations upon the scope of this invention.

The invention thus being described, it would be obvious that the same may be varied in many ways. Such variations should not be regarded as a departure from the spirit and scope of the present invention, and all such variations as would be obvious to one of ordinary skill in the art are intended to be included within the scope of the present invention.

This application references various patents and/or publications. All such patents and/or publications are expressly incorporated herein by reference in their entirely.

Finally, unless otherwise indicated, all numbers expressing specific measurements, especially measurements indicated in the drawings, and so forth as used in the specification are to be understood as being modified by the term "about." Accordingly, unless specifically indicated to the contrary, the numerical parameters set forth in this specification and claims are approximations that may vary depending on the desired properties sought to be obtained by the present invention.

What is claimed is:

1. A conduit fitting, comprising:
    a first shell, a second shell, and a cover, wherein
    the first shell comprises top and bottom edges and the second shell comprises top and bottom edges, with the edges mating along a common plane to form a conduit fitting body, the body defining a cavity;
    the first and second shells further comprising a seal and coupling mechanism that includes a projection or a groove along a length of corresponding edges of the first and second shells to facilitate mating along a common plane;
    the first and second shells together defining at least one proximate opening and at least one distal opening to the cavity;
    the conduit fitting defining a cover opening for access to the cavity; and
    the cover removably seals the cover opening.

2. The conduit fitting of claim 1, wherein the cavity is perpendicular to the plane.

3. The conduit fitting of claim 1, wherein the cavity is in the plane.

4. The conduit fitting of claim 1, wherein the cavity is oval or rectangular.

5. The conduit fitting of claim 1, wherein the seal and coupling mechanism further comprises a rubber seal.

6. The conduit fitting of claim 1, wherein the opening is threaded.

7. The conduit fitting of claim 1, wherein the proximal opening and the distal opening forms a right angle elbow junction.

8. The conduit fitting of claim 1, further comprising a third opening that together with the proximal and distal opening forms a "T" junction.

9. The conduit fitting of claim 1, wherein the seal and coupling mechanism is along the entire length of at least one corresponding edge.

10. The conduit fitting of claim 1, further comprising one or more attachment members to secure the first and second shells together.

11. A method of replacing a conduit junction box routing a plurality of wires, comprising:
    removing the junction box from a conduit at first and second conduit locations, wherein the first and second conduit locations are separated by a replacement length and the conduit has a conduit circumference;
    engaging a first shell to the conduit, wherein the first shell has a first top edge and first bottom edge, a first hemicyclic entry opening proximate the first conduit location and having a first entry circumference, a first hemicyclic exit opening proximate the second conduit location and having a first exit circumference, the first entry and exit openings separated by a length greater than the replacement length, and wherein each of the first entry and exit openings have a first top attachment member adjacent the first top edge and a first bottom attachment member adjacent the first bottom edge;

engaging a second shell to both the conduit and the first shell, wherein the second shell has a second top edge proximate the first top edge and a second bottom edge proximate the first bottom edge, a second hemicyclic entry opening proximate the first conduit location and having a second entry circumference, a second hemicyclic exit opening proximate the second conduit location and having a second exit circumference, the second entry and exit openings separated by a length greater than the replacement length, each of the second entry and exit openings have a second top attachment member adjacent the second top edge and a second bottom attachment member adjacent the second bottom edge, and wherein the combination of the circumferences of the first and second entries is greater than the conduit circumference and the combination of the circumferences of the first and second exits is greater than the conduit circumference; and sealing the first and second shells together via a seal-and coupling mechanism along a corresponding length of edges of the first and second shells;

wherein at least one of the first shell and the second shell define a cover opening for access to an internal cavity that is removably sealed by a cover; and wherein the seal and coupling mechanism is a projection or a groove.

12. The method of claim 1, wherein the seal and coupling mechanism is along the entire length of at least one corresponding edge.

13. The method of claim 1, further comprising securing the first and second shells together via the attachment members.

14. The method of claim 13, wherein the attachment members are fasteners.

15. The method of claim 14, wherein the fasteners are screws.

* * * * *